(12) United States Patent
Kothandapani et al.

(10) Patent No.: US 7,970,218 B1
(45) Date of Patent: *Jun. 28, 2011

(54) METHOD, SYSTEM, AND COMPUTER-READABLE MEDIUM FOR THE ADAPTIVE FILTERING AND COMPRESSION OF VIDEO DATA

(75) Inventors: Govind Kothandapani, Snellville, GA (US); Varadachari Sudan Ayanam, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 16 days.

This patent is subject to a terminal disclaimer.

(21) Appl. No.: 12/504,905

(22) Filed: Jul. 17, 2009

Related U.S. Application Data

(63) Continuation of application No. 11/301,202, filed on Dec. 12, 2005, now Pat. No. 7,567,717.

(51) Int. Cl.
*G06K 9/36* (2006.01)
*G06K 9/40* (2006.01)
(52) U.S. Cl. ........................ 382/232; 382/260
(58) Field of Classification Search .................. 382/232, 382/236, 238, 260, 244, 245; 348/390, 409, 348/415, 426.07, 426.13, 426.14, 14.13; 345/87, 100, 400; 375/240.23, 240.24
See application file for complete search history.

(56) References Cited

U.S. PATENT DOCUMENTS

| 5,532,940 | A | | 7/1996 | Agarwal et al. |
| 5,583,573 | A | | 12/1996 | Asamura et al. |
| 5,651,078 | A | | 7/1997 | Chan |
| 5,708,511 | A | | 1/1998 | Gandhi et al. |
| 5,982,441 | A | | 11/1999 | Hurd et al. |
| 6,144,770 | A | * | 11/2000 | Lennon .......................... 382/236 |
| 6,785,425 | B1 | * | 8/2004 | Feder et al. .................... 382/247 |
| 6,898,313 | B2 | | 5/2005 | Li et al. |
| 7,003,167 | B2 | | 2/2006 | Mukherjee |
| 7,058,231 | B2 | * | 6/2006 | Peters ............................ 382/247 |
| 7,265,736 | B2 | * | 9/2007 | Lee et al. ......................... 345/60 |
| 2004/0165783 | A1 | | 8/2004 | Reynolds et al. |
| 2004/0234142 | A1 | | 11/2004 | Chang et al. |

FOREIGN PATENT DOCUMENTS

WO         9218453       10/1992

OTHER PUBLICATIONS

U.S. Official Action dated Oct. 22, 2009 in U.S. Appl. No. 11/455,016.
U.S. Appl. No. 11/455,016, filed Jun. 16, 2006, entitled "Methods, Systems, and Computer-Readable Media for Adjusting the Quality Level of Data Transmitted Between a Local Computer and a Remote Computer". U.S. Official Action dated Mar. 13, 2009 in U.S. Appl. No. 11/455,016.
U.S. Notice of Allowance / Allowability dated Mar. 23, 2009 in U.S. Appl. No. 11/301,202.
U.S. Official Action dated Dec. 12, 2008 in U.S. Appl. No. 11/301,202.
U.S. Appl. No. 11/301,202, filed Dec. 12, 2005 entitled "Method System and Computer-Readable Medium for the Adaptive Filtering and Compression of Video Data".

* cited by examiner

*Primary Examiner* — Kanji Patel
(74) *Attorney, Agent, or Firm* — Morris Manning & Martin LLP; Tim Tingkang Xia, Esq.

(57) ABSTRACT

A method of filtering and encoding video data in a compressed format is provided. The method includes receiving pixels representing video data from an initial video display, receiving pixels representing video data from a subsequent video display, selecting a group of pixels from the subsequent video display as new video data, determining filtered pixel values from the new video data, and encoding the filtered values in a compressed format for communication to another computer accessible via a computer network.

9 Claims, 7 Drawing Sheets

US 7,970,218 B1

METHOD, SYSTEM, AND COMPUTER-READABLE MEDIUM FOR THE ADAPTIVE FILTERING AND COMPRESSION OF VIDEO DATA

CROSS-REFERENCE TO RELATED APPLICATIONS

This patent application is a continuation of co-pending U.S. patent application Ser. No. 11/301,202, entitled "Method, System, and Computer-Readable Medium for the Adaptive Filtering and Compression of Video Data, filed Dec. 12, 2005 now U.S. Pat. No. 7,567,717, which is expressly incorporated herein by reference in its entirety.

TECHNICAL FIELD

The present invention is related to video compression in a computer network. More particularly, the present invention is related to the adaptive filtering and compression of video data.

BACKGROUND OF THE INVENTION

Computer networks generally include a plurality of interconnected computer systems. Some computer networks utilize a local computer for communicating data to one or more remote computers that are connected to the local computer through the network. From the remote computer, users may control or view activity on a local computer over the network utilizing a hardware interface device connected to the local computer. For instance, utilizing the interface device, a user may view screens of video data on the remote computer that were generated by the local computer. Each screen of video data may comprise thousands or millions of pixels, with each pixel representing a single point in a graphic image. Each point or pixel in a graphic image is represented by a predetermined number of bits based on the number of colors that are displayed on a graphics display. For example, 256 colors may be represented utilizing eight bits per pixel while a "true color" image may be generated utilizing 24 bits per pixel.

Since a single screen comprising a graphics image may comprise millions of bits of video data, the video data must be compressed before being communicated between computers in a network. Video compression enables the communication of video data in fewer bits (and in less time) than if the video data was communicated in its raw form. Typically, video data compression involves compressing the pixel values that make up the frames of video data utilizing a compression algorithm. Many current compression algorithms utilize an exclusive disjunction or "XOR" filtering process to compare the pixel values at various locations in two frames (or screens) of video data. In the XOR process, pixel values at the same locations in successive frames of video data are compared. The result of each comparison is then encoded for communication over the network.

However, current video data compression algorithms based on the XOR process, suffer from a number of drawbacks. One drawback is that as a result of the XOR filtering process, pixel values from previous screens of video data are often compressed along with pixel values from current screens of video data. That is, using the XOR process, unchanged pixel values from previous screens of video data are carried over with changed pixel values from newer screens of video data for compression. As a result, when the video data is compressed, the unchanged pixel values are compressed along with the changed pixel values resulting in less than ideal compression.

It is with respect to these considerations and others that the present invention has been made.

SUMMARY OF THE INVENTION

In accordance with the present invention, the above and other problems are solved by providing in a computer network, a method of increasing the efficiency of filtering and compressing screens of new or changed video data from screens of previously viewed video data. In accordance with other aspects, the present invention relates to a method of compressing video data in a computer network.

According to one aspect of the invention, a method is provided for compressing video data in a computer system. According to the method, a first plurality of pixels representing video data from a previous video display are received. A second plurality of pixels representing video data from a current video display are also received. A pixel is selected in the second plurality of pixels as a current pixel. A filtered value is generated for the current pixel by determining whether the values of pixels adjacent to the current pixel are within a threshold value of the values of other adjacent pixels within the first plurality of pixels. An encoded value is then generated for the filtered value by applying a first algorithm wherein lossless compression is desired or by applying a second algorithm wherein lossy compression is desired. Utilizing lossy compression, some information in the screen display may be discarded. Utilizing lossless compression, no information is discarded. The encoded value is then compressed for transmission to a remote computer system.

According to aspects of the method, generating a filtered value may comprise determining whether the value of a first pixel adjacent to the current pixel in the second plurality of pixels is equal to the value of a corresponding pixel in the first plurality of pixels. If the value of the first pixel adjacent to the current pixel in the second plurality of pixels is equal to the value of a corresponding pixel in the first plurality of pixels, then the filtered value of the current pixel is set equal to the value of a pixel corresponding to the current pixel in the first plurality of pixels.

If the value of the pixel adjacent to the current pixel in the second plurality of pixels is not equal to the value of a corresponding pixel in the first plurality of pixels, a first threshold check is performed to determine whether the value of the first pixel adjacent to the current pixel is within a threshold value of a second pixel adjacent to the first pixel. A second threshold check is also performed to determine whether the value of the second pixel adjacent to the current pixel is within a threshold value of a third pixel adjacent to the current pixel. The filtered value of the current pixel is set equal to the value of the third pixel adjacent to the current pixel if the first threshold check is true and the second threshold check is false. Otherwise, the filtered value of the current pixel is set equal to the value of the first pixel adjacent to the current pixel.

According to other aspects of the method, generating an encoded value for the filtered value may include determining whether lossless or lossy compression should be utilized. If lossless compression should be utilized, a determination is made as to whether the value of the current pixel is equal to the filtered value of the current pixel. If so, the encoded value for the current pixel is set equal to zero. If not, the encoded value is set to a code representing the color black if the value of the current pixel is zero. Otherwise, the encoded value for the current pixel is set equal to the actual value of the current pixel.

If lossy compression is to be utilized, a threshold check is performed to determine whether the value of the current pixel and the filtered value are within a threshold value of one another. If the value of the current pixel and the filtered value are within a threshold value of one another, the encoded value for the current pixel is set to zero. If the value of the current pixel and the filtered value are not within a threshold value of one another and the actual value of the current pixel is zero, the encoded value is set to a code representing the color black. Otherwise, the encoded value for the current pixel is set equal to the actual value of the current pixel.

According to other aspects of the invention, compressing the encoded value comprises determining whether the encoded value is zero. In response to determining that the encoded value is zero, incrementing a run length. In response to determining that the encoded value is not zero, flushing a pending run and outputting the encoded value. Flushing a pending run may include outputting a first code and the run length when the length of the run is greater than a predetermined length and outputting a second code and the run length when the length of the run is less than the predetermined length.

According to other aspects of the invention, the first pixel adjacent to the current pixel may comprise the pixel immediately to the left of the current pixel. The second pixel adjacent to the current pixel may comprise the pixel immediately to the left and above the current pixel. The third pixel adjacent to the current pixel may comprise the pixel immediately above the current pixel. Other configurations of adjacent pixels may also be utilized.

The above-described aspects of the invention may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
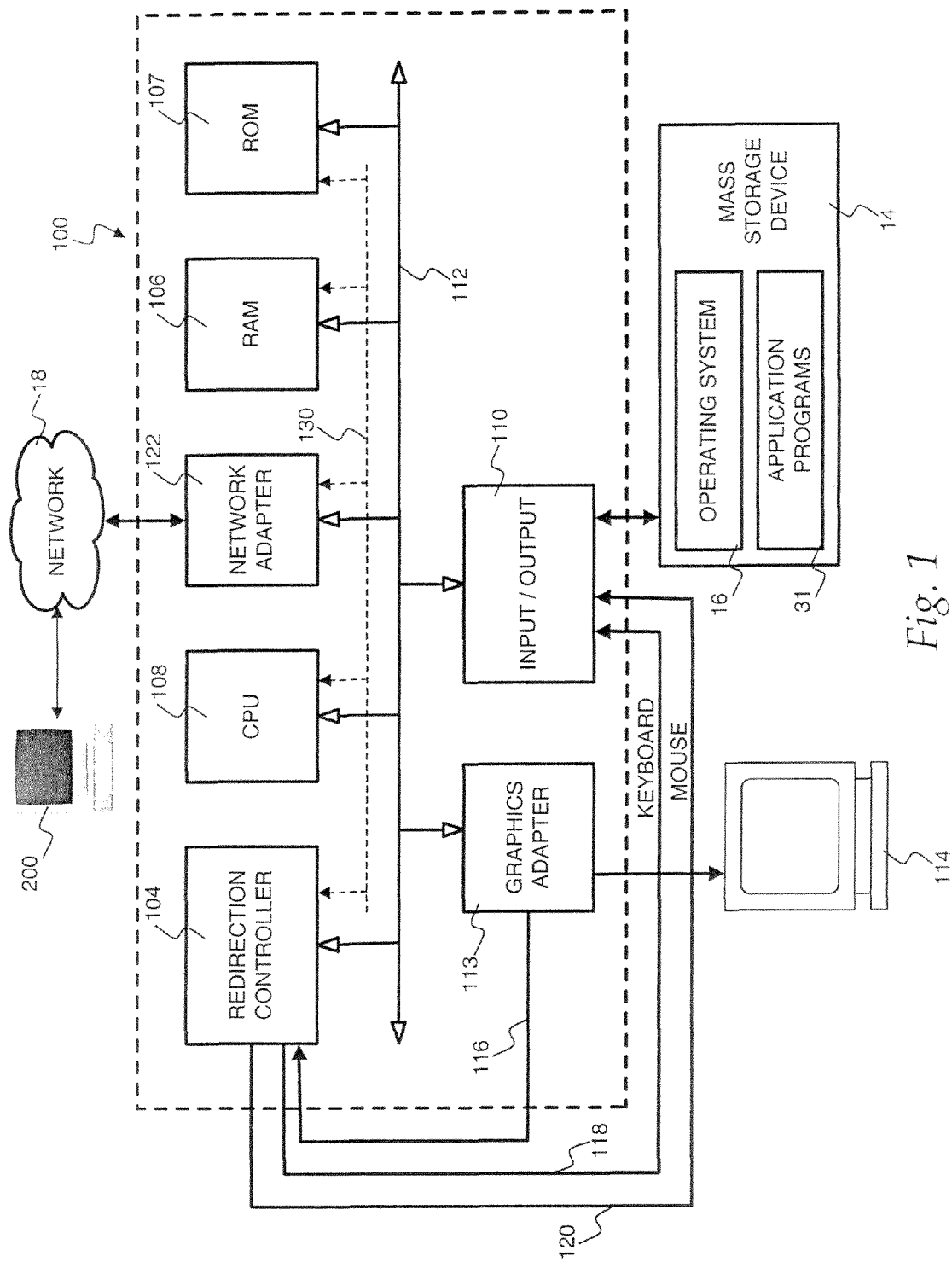
FIG. 1 is a computer architecture diagram showing aspects of a computer utilized in the various embodiments of the invention.

Embodiments of the present invention provide methods, systems, apparatus, and computer-readable media for compressing screens of video data. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with an application program that runs on an operating system on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the various embodiments of the invention will now be described. In particular, a computer 100 is provided that is operative to compress and transmit its video display to a remote computer. The compressed data may be decompressed and displayed at the remote computer. The computer 100 is also operative to receive input remotely from the remote computer in the form of keyboard or mouse input. In this manner, the computer 100 may be controlled remotely. In order to provide this functionality, the computer 100 includes a baseboard, or "motherboard", which is a printed circuit board to which a multitude of components or devices may be connected by way of a system bus 112 or other electrical communication path. In one illustrative embodiment, these components include, without limitation, a redirection controller 104, a central processing unit ("CPU") 108, a network adapter 122, a system memory and an input/output module 110. It is also contemplated that the computer 100 may include other components that are not explicitly shown in FIG. 1.

The system bus 112 utilized by the computer 100 provides a two-way communication path for all components connected to the system bus 112. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus 112. Buses and the associated functionality of master-slave communications are well-known to those skilled in the art, and therefore not discussed in further detail herein.

The redirection controller 104 allows a user to control the keyboard and mouse functions of the local computer 100 from the remote computer 200 over the network 18. The redirection controller 104 may also be utilized to provide the video display shown on the local computer 100 to the remote computer 200. In particular, in accordance with illustrative embodiments of the invention, the redirection controller 104 communicates compressed video data generated on the local computer 100 to the remote computer 200. To accomplish the above-noted and other functions, the redirection controller 104 is communicatively connected to one or more components either directly or by way of a management bus 130. In particular, the redirection controller 104 is connected to video out port 116 of the graphics adapter 113, as well as a keyboard input port and a mouse input port of the input/output module 110, via the communications lines 118 and 120, respectively. It will be appreciated that the keyboard port and mouse port may include universal serial bus ("USB") ports and/or PS/2 ports. It should be appreciated that the redirection controller 104 may receive keyboard and mouse commands from the computer 200 via the network 18. When received, the redirection controller 104 is operative to pass the commands through to the input/output controller 110 so that the commands appear to the computer 100 to have been made utilizing local keyboard and mouse devices.

The network adapter 122 is communicatively connected to the management bus 130. The management bus 130 is used by the redirection controller 104 to communicate compressed video data to the remote computer 200 over the network adapter 122. Like the system bus 112, the component that initiates communication on a bus is referred to a master and the component to which the communication is sent is referred to a slave. As such, the redirection controller 104 functions as the master on the management bus 130 in most circumstances, but may also function as a slave in other circumstances. Each of the various components communicatively connected to the redirection controller 104 by way of the management bus is addressed using a slave address. In one embodiment, the management bus 130 may be an I$^2$C® bus, which is manufactured by Phillips Semiconductors® and described in detail in the I$^2$C® bus Specification, version 2.1 (January 2000). The redirection controller 104 also includes compression program code which may be an executable program module containing program code for filtering and compressing video data for communication over the network 18 to the remote computer 200. The operations performed by the compression program code for compressing video data will be described in greater detail below with respect to FIGS. 4-7. It should be appreciated that the redirection controller 104 may be configured with its own network adapter for communicating with the remote computer 200 directly over the network 18.

The system memory in the computer 100 may include including a random access memory ("RAM") 106 and a read-only memory ("ROM") 107. The ROM 107 may store a basic input/output system that includes program code containing the basic routines that help to transfer information between elements within the computer 100. The network adapter 122 may be capable of connecting the local computer 100 to the computer 200 via the network 18. Connections which may be made by the network adapter 122 may include local area network ("LAN") or wide area network ("WAN") connections. LAN and WAN networking environments are commonplace in offices, enterprise-wide computer networks, intranets, and the Internet.

The CPU 108 is a standard central processor that performs arithmetic and logical operations necessary for the operation of the remote computer system 100. CPUs are well-known in the art, and therefore not described in further detail herein. The input/output module 110 is used as a communication medium between any number and type of peripheral devices and the system bus 112. Communications destined for the CPU 108, the redirection controller 104 or any other component coupled to the system bus 112 and issued by a peripheral device must therefore pass through the input/output module 110 to the system bus 112 and then to the necessary component.

As shown in FIG. 1, the input/output module 110 is connected a mass storage device 14 for storing an operating system 16 and application programs 31. The operating system 16 comprises a set of programs that control operations of the local computer 100 and allocation of resources. The set of programs, inclusive of certain utility programs, also provide a graphical user interface to the user. An application program is software that runs on top of the operating system software and uses computer resources made available through the operating system to perform application specific tasks desired by the user.

The mass storage device 14 and its associated computer-readable media, provide non-volatile storage for the local computer 100. Although the description of computer-readable media contained herein refers to a mass storage device, such as a hard disk or CD-ROM drive, it should be appreciated by those skilled in the art that computer-readable media can be any available media that can be accessed by the local computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A graphics adapter 113 is also utilized that enables the display of video data (i.e., text and/or graphics) on a display unit 114. It will be appreciated that the video graphics adapter may process analog signals (i.e., VGA) or digital signals (i.e., DVI) for display on a compatible display unit. The video graphics adapter 114 includes a video buffer for temporarily storing one or more lines of video data to be displayed on the display unit 114.

It will be appreciated that the computer 200 described briefly above with respect to FIG. 1 may be a general purpose computer including some or all of the conventional computing components described above relative to the local computer 100. In addition, the computer 200 may further include a hardware keyboard and mouse connected to an input/output module for controlling keyboard and mouse functions of the computer 100 utilizing the redirection controller 104. It should also be appreciated that the computers 100 and 200 may also comprise other types of computing devices, including hand-held computers, embedded computer systems, personal digital assistants, and other types of computing devices known to those skilled in the art.

Figure 2:
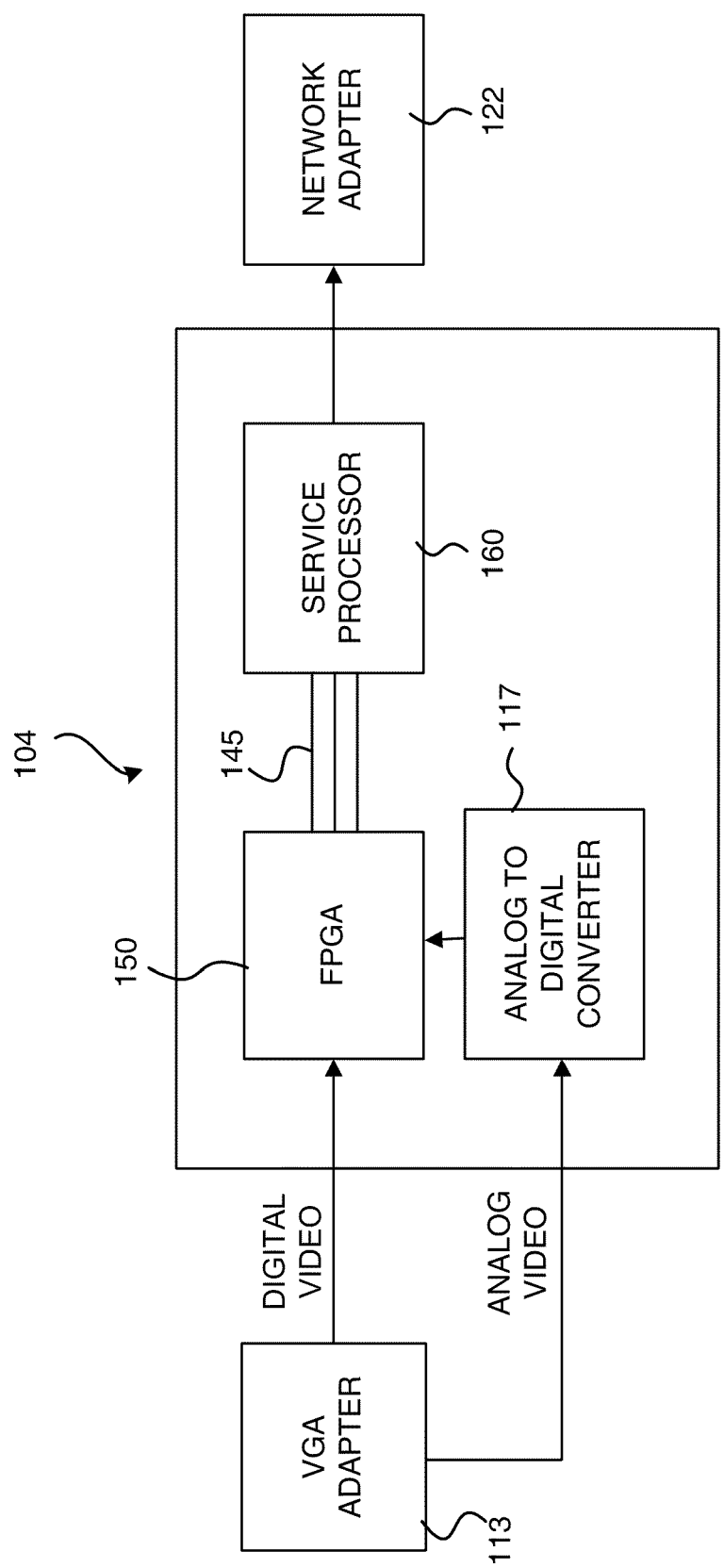
FIG. 2 is a computer architecture diagram illustrating aspects of a redirection controller provided in the various embodiments of the invention.

Turning now to FIG. 2, an illustrative hardware architecture of the redirection controller 104 will now be described. As briefly discussed above with respect to FIG. 1, the redirection controller 104 is communicatively connected to the graphics adapter 113 for receiving, filtering, and compressing video data which is then communicated to the remote computer 200 through the network adapter 122. As shown in FIG. 2, the redirection controller 104 may be connected to the graphics adapter 113 through a digital video or analog video connection. Where an analog video connection is utilized, the redirection controller 104 may utilize an analog to digital converter 117 to convert the received analog display screens into a digital format.

In accordance with an illustrative embodiment of the invention, the components of the redirection controller 104 may be incorporated into a firmware card, such as a PCI card, which is "plugged-in" to the motherboard of the computer 100. These components may include a field-programmable gate array ("FPGA") 150 and a service processor 160. The FPGA 150 communicates with the service processor 160 over parallel bus 145. The service processor 160 is a microcontroller that instructs the FPGA 150 to capture screens of video data and compress changed video data from the video graphics adapter 113 in accordance with program instructions contained in the compression program code 132. Once the changed video data has been compressed, the FPGA 150 generates and sends an interrupt signal to the service processor 160. The service processor 160 then sends the compressed video data to the remote computer 200 via the network adapter 122. It will be appreciated that the FPGA 150 and the service processor 160 may be application specific circuits ("ASICs") designed for performing the aforementioned tasks. ASICs are well known to those skilled in the art. Those skilled in the art will further appreciate that the redirection controller 104 may also be incorporated as an external hardware device. The external device may include a video port for connection to a video graphics adapter, keyboard and mouse ports, and a network port (e.g., a network interface card) for connection to a computer network.

Figure 3:
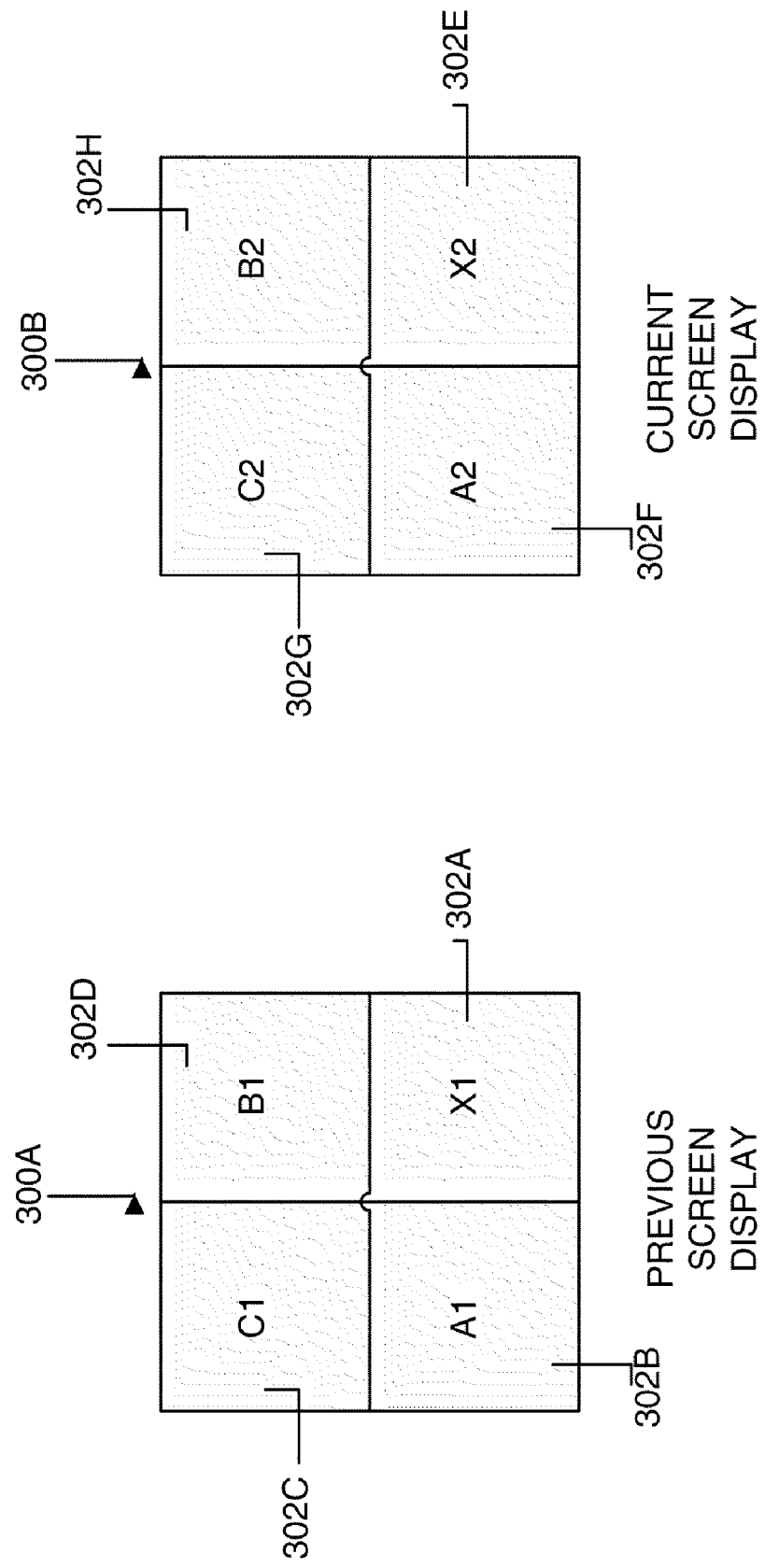
FIG. 3 is a screen diagram showing an arrangement of pixels on a previous screen display and a current screen display utilized in embodiments of the present invention.

Turning now to FIG. 3, two screens 300A and 300B of pixels representing video data are shown. In particular, the screen 300A represents several pixels 302A-302D from a previous screen display. The screen 300B represents several pixels 302E-302H of a current screen display. It should be appreciated that the pixels in each of the screen displays correspond to one another. For instance, pixel 302E corresponds to pixel 302A, pixel 302F corresponds to pixel 302B, pixel 302G corresponds to pixel 302C, and pixel 302H corresponds to pixels 302D. It should be appreciated that each of the pixels has an associated value that describes the color and intensity of the pixel. For instance, in an embodiment of the invention, a 15 bit value is utilized to represent each pixel.

As will be described in greater detail below, the values of the various pixels 302A-320H are utilized to determine a filtered value and an encoded value for a current pixel. The current pixel is the pixel 302E and may be referred to herein as "X2." The pixel corresponding to the current pixel in the previous display screen is the pixel 302A and may be referred to herein as "X1." The pixel immediately to the left of the current pixel is the pixel 302F, which may be referred to herein as "A2." The pixel 302B in the previous screen display corresponds to A2. The pixel 302B may be referred to herein as "A1." The pixel to the left and above the current pixel is the pixel 302G, which may be referred to herein as "C2." The pixel 302C in the previous screen display corresponds to C2. The pixel 302C may be referred to herein as "C1." The pixel directly above the current pixel is the pixel 302H, which may be referred to herein as "B2." The pixel 320D corresponds to B2 and may be referred to herein as "B1." It should be appreciated that the alphanumeric label assigned to each pixel is for convenient reference only.

It should also be appreciated that each pixel in a current display screen is processed in the manner described herein. In this manner, an entire display screen is compressed and transmitted. Once processing for the current display screen has completed, the current display screen becomes the previous display screen and a new display screen becomes the current display screen. In this manner, all pixels of all display screens are processed. It should also be appreciated that the computer 200 performs a decompression algorithm to decompress the data encoded by the compression algorithm described herein. Decompression is performed in a reverse manner to the compression algorithm described herein.

Figure 4:
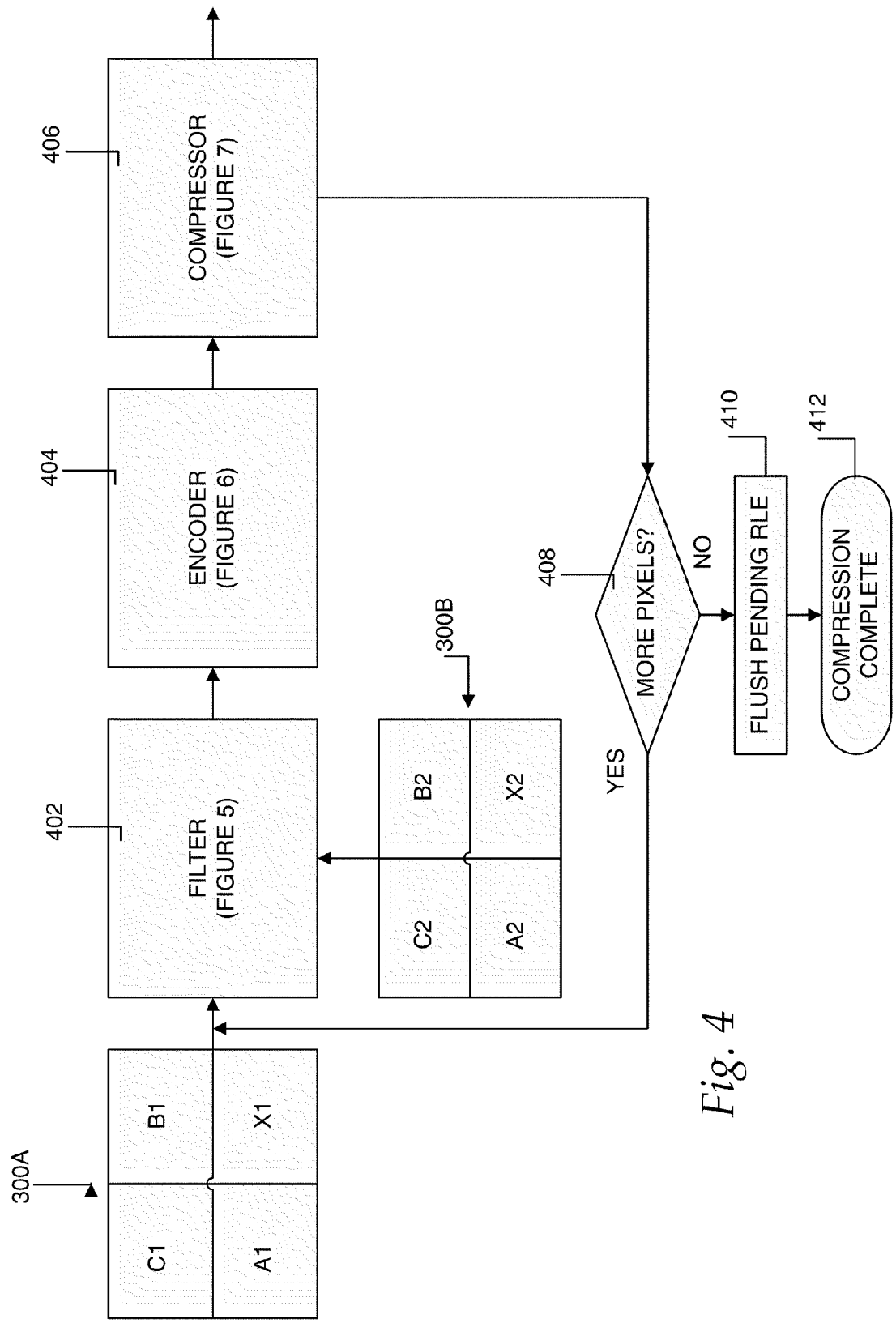
FIGS. 4-7 are flow diagrams illustrating aspects of a process for compressing video data according to one embodiment of the invention.

Turning now to FIG. 4, an illustrative software architecture for the software components of the redirection controller 104 will be described. It should be appreciated that, according to the embodiments of the invention, the software described herein has been implemented as a FPGA. Alternatively, however, the software operations described herein may be performed by a dedicated hardware circuit, by program code executing on a general-purpose or specific-purpose microprocessor, or through some other combination of hardware and software.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 4-7 making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

As shown in FIG. 4, the redirection controller 104 includes a filter 402 that takes the previous screen display 300A and the current screen display 300B and generates a filtered value for a current pixel within the current screen display 300B. The filtering process generates a predicted value for the current pixel based upon the values of pixels adjacent to the current pixel. An illustrative routine 500 will be described below with respect to FIG. 5 for generating a filtered value for the current pixel.

The redirection controller 104 also includes an encoder 404. The encoder 404 generates encoded values from predicted values. Depending upon whether lossless or lossy compression is desired, an encoded value is generated. In particular, the encoder 404 operates in a manner designed to allow the encoded values to be highly compressed. Additional details regarding the operation of the encoder 404 are provided below with respect to FIG. 6.

The redirection controller 104 also includes a compressor 406. The compressor 406 receives the encoded values from the encoder 404 and generates compressed data as its output. Because of the manner in which the encoder 404 encodes the data stream, the compressor 406 can utilize a simplified compression algorithm. In particular, according to one embodiment of the invention, the compressor 406 utilizes a simplified run length encoded ("RLE") algorithm. Additional details regarding the operation of the compressor 406 are provided below with respect to FIG. 7.

It should be understood that the process illustrated in FIG. 4 is repeated for each pixel location in the current screen of pixel data. Accordingly, at operation 408, a determination is made as to whether additional pixels remain to be filtered, encoded, and compressed. If additional pixels remain, the process begins again. Otherwise, the process continues to operation 410, where a pending run length of encoded values is flushed by the compressor 406. The process then continues to operation 412, where the compression process is completed. It will be appreciated by those skilled in the art that by utilizing the above-described method of filtering pixel values, many of the values to be encoded by the encoder 404 will be runs of repeating zero values which are more easily compressed than non-repeating values.

Figure 5:
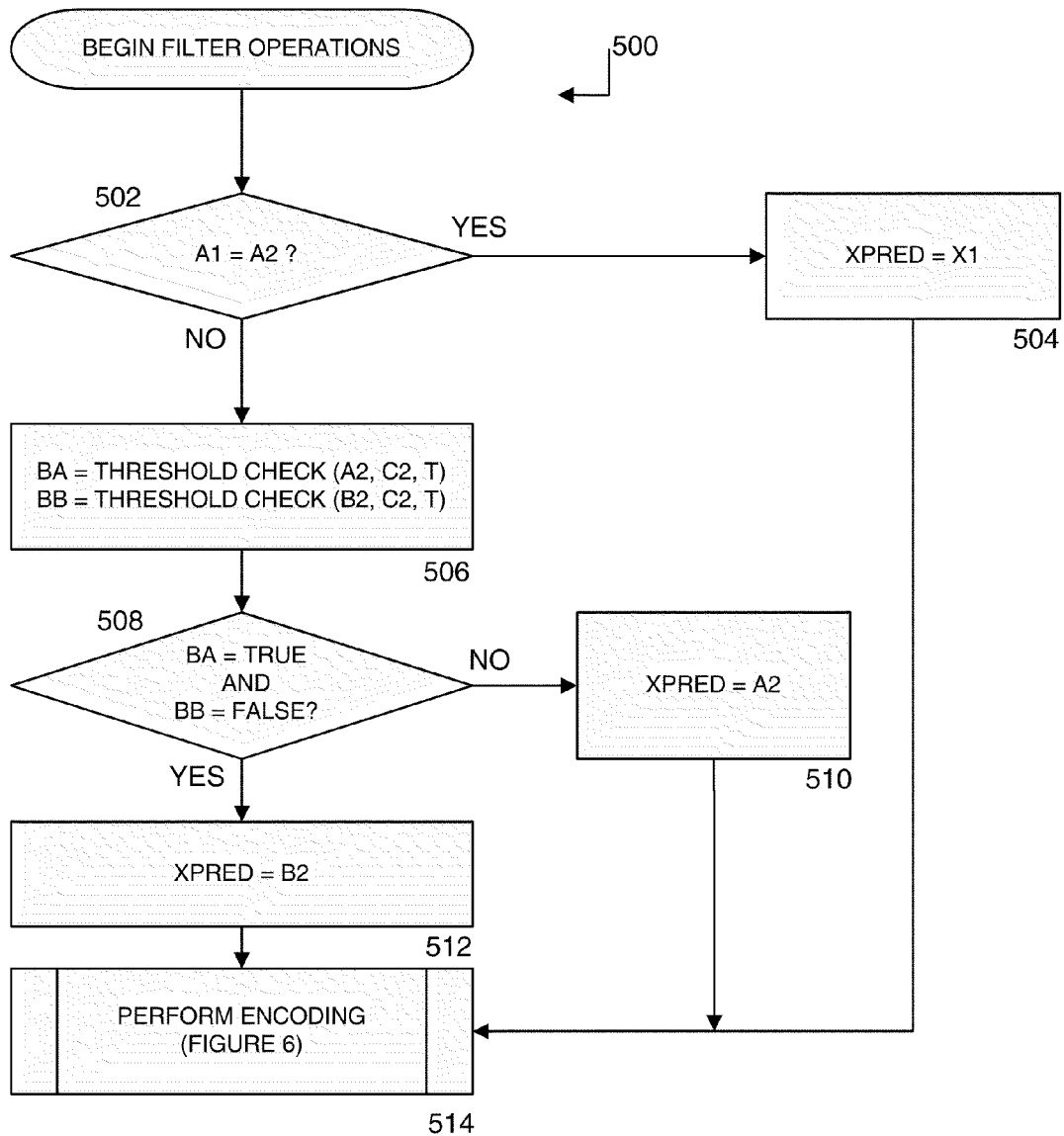

Referring now to FIG. 5, additional details regarding the operation of the filter 402 will be described. In particular, FIG. 5 illustrates a routine 500 performed by the filter 402 for filtering pixel values according to one embodiment of the invention. As described briefly above, the filter 402 receives a first plurality of pixel values representing video data from a previous video display. The filter 402 also receives a second plurality of pixel values representing video data from a current video display. The filter 402 then selects a pixel within the second group of pixels as a current pixel. As mentioned briefly above, the current pixel is referred to herein as "X2" The filter also identifies several pixels surrounding the current pixel. Pixels corresponding to the identified pixels in the first plurality of pixel values are also identified. In particular, the pixels discussed previously with respect to FIG. 3 as A2, B2, C2, X1, A1, B1, and C1 are identified by the filter 402.

The routine 500 begins at operation 502, where the filter 402 determines whether the values for pixels A1 and A2 are equal. If these values are equal, the routine 500 branches to operation 504, where a predicted value for the current pixel (referred to herein as "Xpred") is set to the value of X1. The routine 500 then continues from operation 504 to operation 514. If the values of A1 and A2 are not equal, the routine 500 continues to operation 506.

At operation 506, a threshold check is made to determine whether the values of pixels A2 and C2 are within are within a threshold value ("T") of one another. In order to perform this analysis, a threshold check routine is provided that returns true if the values of two variables are within a threshold value of one another. Otherwise the routine returns a false value. At operation 506, a threshold check is also made to determine whether the values of pixels B2 and C2 are within a threshold value of one another. As used herein, "BA" refers to the threshold check between A2 and C2, and "BB" refers to the threshold check between B2 and C2. Based on the values of these comparisons, a prediction can be made about the value of the current pixel.

From operation 506, the routine 500 continues to operation 508, where a determination is made as to whether BA is true and BB is false. If not, the routine 500 branches to operation 510, where the value of Xpred is set to the value of A2. If so, the routine 500 continues to operation 512, where the value of Xpred is set to the value of B2. From operations 510 and 512, the routine 500 continues to operation 514, where encoding of the predicted value for the current pixel occurs.

Figure 6:
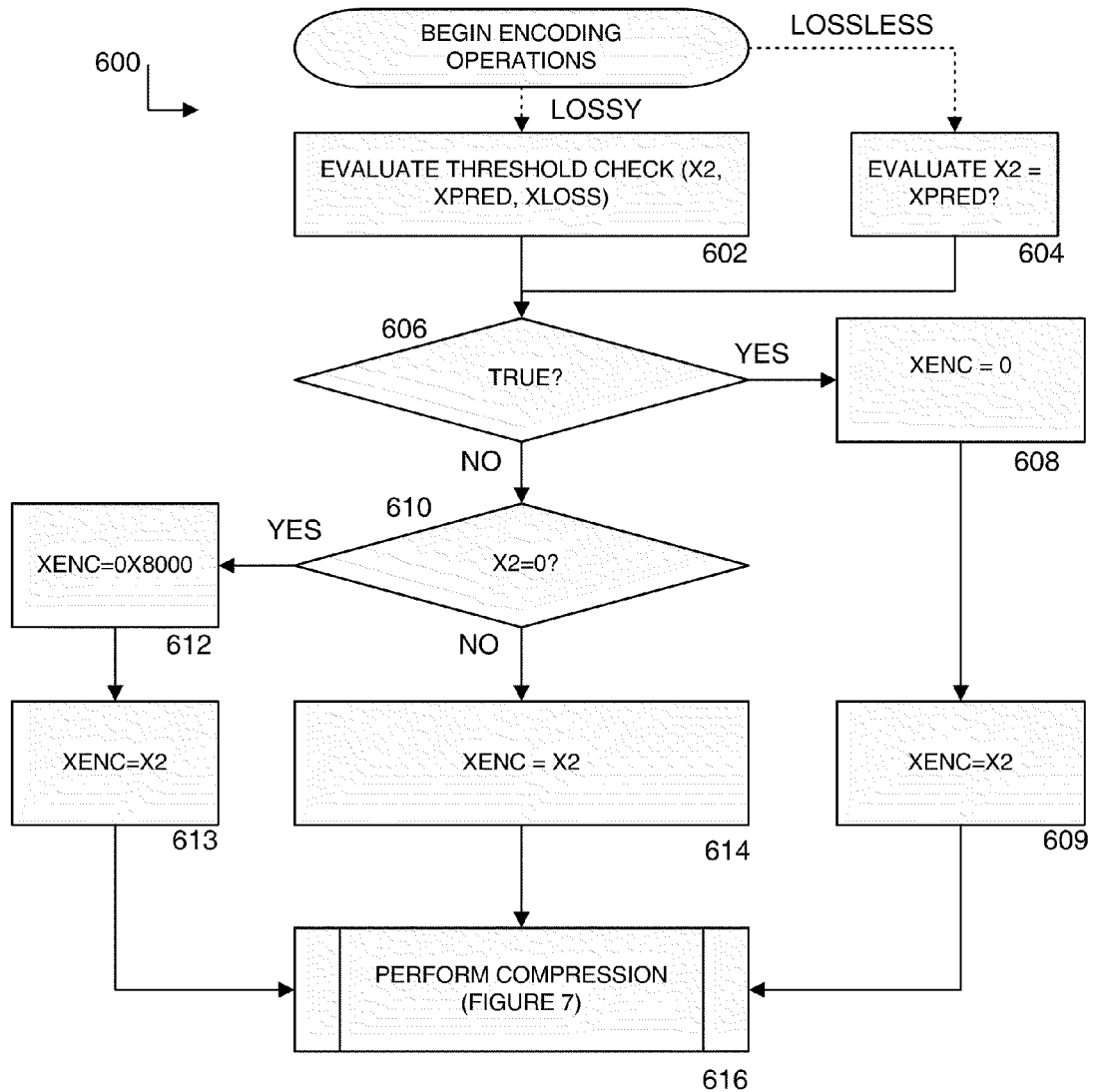

Turning now to FIG. 6, additional details regarding the operation of the encoder 404 will be described. As discussed briefly above, the encoder 404 receives the predicted value for the current pixel, Xpred, as input. If the compression for the current screen is to be lossless, the routine 600 begins at operation 604, where an evaluation is made as to whether Xpred is equal to X2. If the compression for the current screen is to be lossy, the routine 600 begins at operation 602, where an evaluation is made as to whether X2 and Xpred are within a threshold value of one another. From operations 604 and 602, the routine 600 continues to operation 606.

At operation 606, a determination is made as to whether the evaluation made at operations 604 or 602 were true. If the respective operation was evaluated as true, the routine 600 branches to operation 608, where the encoded value for the current pixel (referred to herein as "Xenc") is set to zero. It should be appreciated that zero represents the color black. It should also be appreciated that highly compressible runs of pixel values are created by encoding the value as black where the predicted and actual pixel values for the current pixel are the same or within a threshold value of one another.

If, at operation 606, it is determined that the actual and predicted value of the current pixel are not equal or that the actual and predicted values of the current pixel are not within a threshold value of one another, the routine 600 continues to operation 610. At operation 610, a determination is made as to whether the actual pixel value for the current pixel is zero. If the actual value is zero, the routine 600 branches to operation 612, where Xenc is set to a value specified to represent the actual color black. In this manner, encoded values actually representing black pixels can be distinguished from encoded values representing runs of identical or close pixel values. According to an embodiment, the value '0x8000' is utilized to represent black. If, at operation 610, it is determined that the actual pixel value is not zero, the routine 600 continues to operation 614, where the value of Xenc is set to the value of the current pixel. From operation 612, the routine 600 continues to operation 612, where the value of Xenc is set to the value of X2. This operation is also performed at block 609. From operations 609, 613, and 614, the routine 600 continues to operation 616, where compression is performed on the encoded value.

Figure 7:
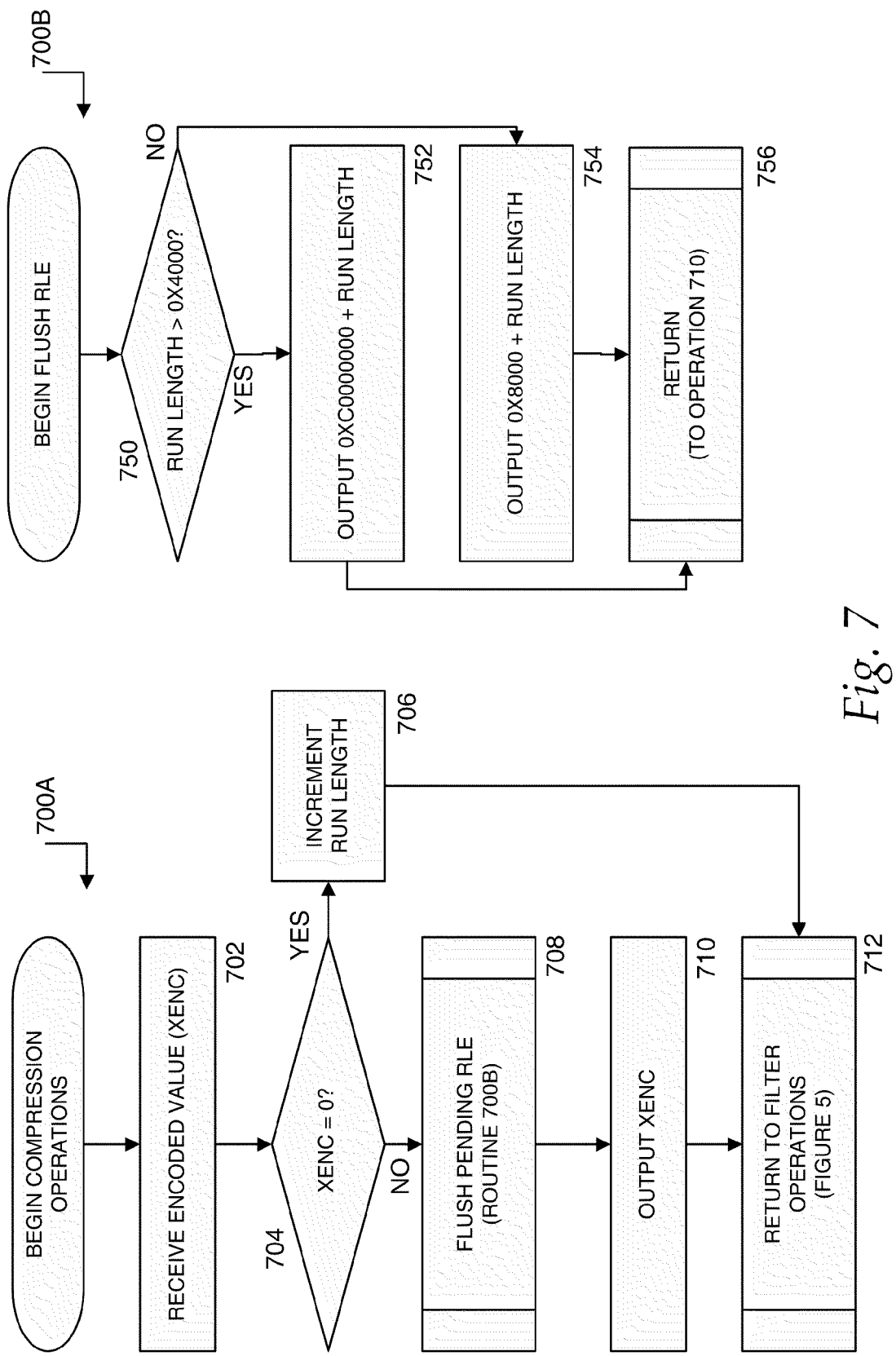

Referring now to FIG. 7, additional details regarding the operation of the compressor 406 will be provided. In particular, the routine 700A illustrates a simplified RLE algorithm utilized to compress the encoded values output by the encoder 404. The routine 700A begins at operation 702, where the encoded value, Xenc, is received from the encoder 404. The routine 700A then continues to operation 704, where a determination is made as to whether the encoded value is equal to zero. If the encoded value is equal to zero, the routine 700A continues to operation 706, where the current run length is incremented. The routine 700A then continues to operation 712.

If, at operation 704, the compressor 406 determines that the encoded value is not zero, the routine 700A continues to operation 708, where the pending run is flushed. An illustrative routine 700B is described below for flushing the pending run. The routine 700A then continues to operation 710, where the encoded value, Xenc, is output into the output data stream. The routine 700A then continues to operation 712, where filtering operations are continued as described in FIG. 5, above.

The routine 700B illustrates a process performed by the compressor 406 for flushing a pending run of data. In particular, the routine 700B begins at operation 750, where a determination is made as to whether the current run length exceeds a predetermined number of bytes. If the current run length exceeds the predetermined number of bytes, the routine 700B continues to operation 752, where a first code is output plus the run length. If the current run length does not exceed the predetermined number of bytes, the routine 700B branches to operation 754, where a second code is output plus the run length. From operations 752 and 754, the routine 700B continues to operation 756, where it returns to operation 710, described above.

It will be appreciated that embodiments of the present invention provide methods, systems, apparatus, and computer-readable medium for filtering, encoding, and compressing video data. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method of predicting video data in a computer system, comprising performing computer-implemented operations for:
   receiving a first plurality of pixels representing video data from a previous video display;
   receiving a second plurality of pixels representing video data from a current video display;
   selecting a pixel in the second plurality of pixels as a current pixel; and
   generating a predicted value for the current pixel by determining whether the values of pixels adjacent to the current pixel are within a threshold value of the values of other adjacent pixels within the first plurality of pixels.

2. The computer-implemented method of claim 1, wherein generating a predicted value comprises:
   determining whether the value of a first pixel adjacent to the current pixel in the second plurality of pixels is equal to the value of a corresponding pixel in the first plurality of pixels; and
   setting the predicted value of the current pixel equal to the value of a pixel corresponding to the current pixel in the first plurality of pixels in response to determining that the value of the first pixel adjacent to the current pixel is equal to the value of a corresponding pixel in the first plurality of pixels.

3. The computer-implemented method of claim 2, further comprising in response to determining that the value of the pixel adjacent to the current pixel is not equal to the value of a corresponding pixel in the first plurality of pixels:
   performing a first threshold check to determine whether the value of the first pixel adjacent to the current pixel is within a threshold value of a second pixel adjacent to the current pixel;
   performing a second threshold check to determine whether the value of the second pixel adjacent to the current pixel is within a threshold value of a third pixel adjacent to the current pixel;
   setting the predicted value of the current pixel equal to the value of the third pixel adjacent to the current pixel if the first threshold check is true and the second threshold check is false; and
   otherwise setting the predicted value of the current pixel equal to the value of the first pixel adjacent to the current pixel.

4. A non-transitory computer storage medium having computer-executable instructions stored thereon which, when executed by a computer, cause the computer to:
   receive a first plurality of pixels representing video data from a previous video display;
   receive a second plurality of pixels representing video data from a current video display;
   select a pixel in the second plurality of pixels as a current pixel; and
   generate a predicted value for the current pixel by determining whether the values of pixels adjacent to the current pixel are within a threshold value of the values of other adjacent pixels within the first plurality of pixels.

5. The non-transitory computer storage medium of claim 4, wherein generating a predicted value comprises:
   determining whether the value of a first pixel adjacent to the current pixel in the second plurality of pixels is equal to the value of a corresponding pixel in the first plurality of pixels; and
   setting the predicted value of the current pixel equal to the value of a pixel corresponding to the current pixel in the first plurality of pixels in response to determining that the value of the first pixel adjacent to the current pixel is equal to the value of a corresponding pixel in the first plurality of pixels.

6. The non-transitory computer storage medium of claim 5, comprising further computer-readable instructions which, when executed by the computer, are configured to cause the computer, in response to determining that the value of the pixel adjacent to the current pixel is not equal to the value of a corresponding pixel in the first plurality of pixels, to:
   perform a first threshold check to determine whether the value of the first pixel adjacent to the current pixel is within a threshold value of a second pixel adjacent to the current pixel;
   perform a second threshold check to determine whether the value of the second pixel adjacent to the current pixel is within a threshold value of a third pixel adjacent to the current pixel;
   set the predicted value of the current pixel equal to the value of the third pixel adjacent to the current pixel if the first threshold check is true and the second threshold check is false; and to
   otherwise set the predicted value of the current pixel equal to the value of the first pixel adjacent to the current pixel.

7. A computer-controlled apparatus, comprising:
   a central processing unit (CPU);
   a graphics adapter; and
   a memory containing computer-readable instructions stored thereon, which when executed by the CPU will cause the CPU to
   receive a first plurality of pixels representing video data from a previous video display,
   receive a second plurality of pixels representing video data from a current video display,
   select a pixel in the second plurality of pixels as a current pixel, and
   generate a predicted value for the current pixel by determining whether the values of pixels adjacent to the current pixel are within a threshold value of the values of other adjacent pixels within the first plurality of pixels.

8. The computer-controlled apparatus of claim 7, wherein generating a predicted value comprises:
   determining whether the value of a first pixel adjacent to the current pixel in the second plurality of pixels is equal to the value of a corresponding pixel in the first plurality of pixels; and
   setting the predicted value of the current pixel equal to the value of a pixel corresponding to the current pixel in the first plurality of pixels in response to determining that the value of the first pixel adjacent to the current pixel is equal to the value of a corresponding pixel in the first plurality of pixels.

9. The computer-controlled apparatus of claim 8, wherein the memory includes further computer-readable instructions which, when executed by the CPU, are configured to cause the CPU, in response to determining that the value of the pixel adjacent to the current pixel is not equal to the value of a corresponding pixel in the first plurality of pixels, to:

perform a first threshold check to determine whether the value of the first pixel adjacent to the current pixel is within a threshold value of a second pixel adjacent to the current pixel;

perform a second threshold check to determine whether the value of the second pixel adjacent to the current pixel is within a threshold value of a third pixel adjacent to the current pixel;

set the predicted value of the current pixel equal to the value of the third pixel adjacent to the current pixel if the first threshold check is true and the second threshold check is false; and to otherwise set the predicted value of the current pixel equal to the value of the first pixel adjacent to the current pixel.

* * * * *